No. 771,964. PATENTED OCT. 11, 1904.
H. C. BADENHOP & W. ROSEBROCK.
CORN PLANTER.
APPLICATION FILED AUG. 8, 1904.
NO MODEL. 2 SHEETS—SHEET 2.

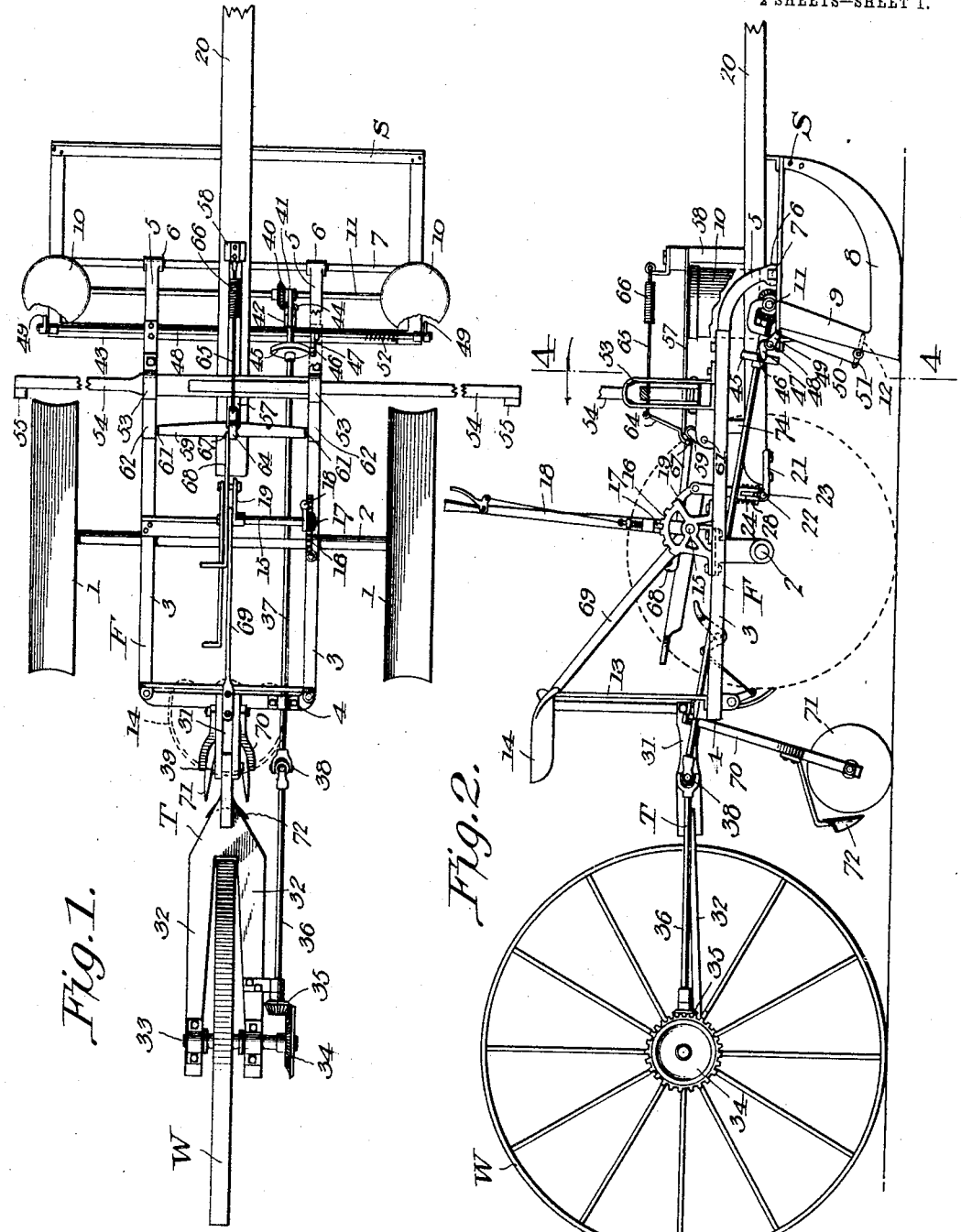

Witnesses
Hermann C. Badenhop
Wilhelm Rosebrock, Inventors.
by C. A. Snow & Co.,
Attorneys No. 771,964. Patented October 11, 1904.

UNITED STATES PATENT OFFICE.

HERMANN C. BADENHOP AND WELHELM ROSEBROCK, OF WAUSEON, OHIO.

CORN-PLANTER.

SPECIFICATION forming part of Letters Patent No. 771,964, dated October 11, 1904.

Application filed August 8, 1904. Serial No. 219,999. (No model.)

*To all whom it may concern:*

Be it known that we, HERMANN C. BADENHOP and WELHELM ROSEBROCK, citizens of the United States, residing at Wauseon, in the county of Fulton and State of Ohio, have invented a new and useful Corn-Planter, of which the following is a specification.

This invention relates to corn-planters; and it has particular reference to check-rowers of that class which are operated without a chain stretched across the field for the purpose of actuating the seed-dropping mechanism and in which consequently means is provided for the purpose of transmitting motion to the corn-dropping mechanism from a ground-engaging wheel.

Among the objects of our invention are by means of a simple attachment to provide for the automatic operation of the corn-dropping mechanism at regular intervals, also to mark the ground at the end of each row, so as to indicate precisely the point at which the first hill in the next row is to be planted.

With these and other ends in view, which will readily appear as the nature of the invention is better understood, the same consists in the improved construction and novel arrangement and combination of parts, which will be hereinafter fully described, and particularly pointed out in the claims.

Figure 3:
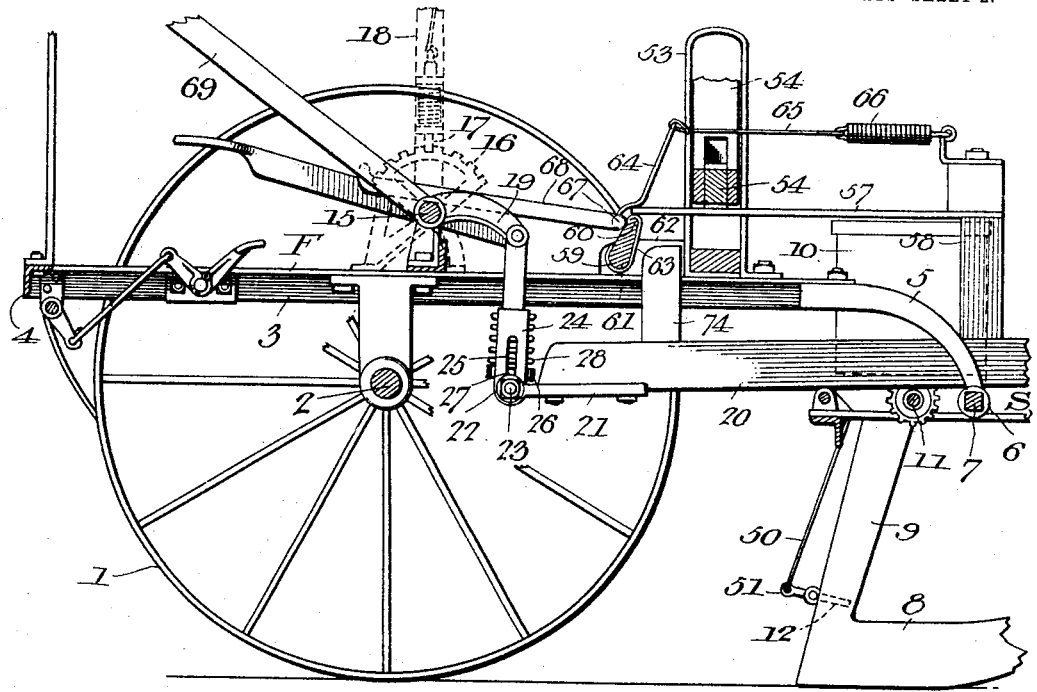
Figure 4:
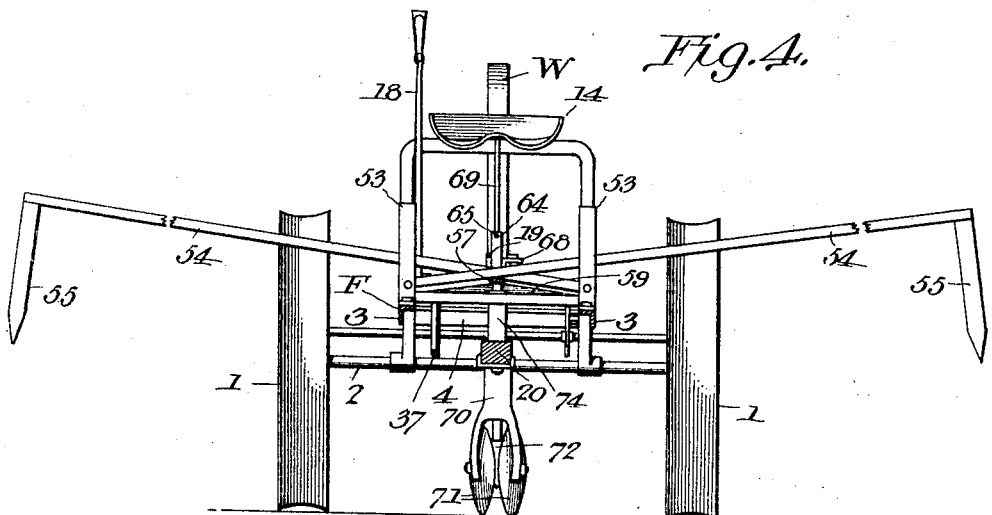

In the accompanying drawings, Figure 1 is a top plan view of a corn-planter constructed in accordance with the principles of the invention. Fig. 2 is a side elevation, partly in section. Fig. 3 is a longitudinal sectional view, on an enlarged scale, of a portion of the machine; and Fig. 4 is a transverse sectional view taken on the line 4 4 in Fig. 2.

Corresponding parts in the several figures are indicated by similar characters of reference.

The ground-engaging traction-wheels 1 1 are connected by the axle 2, which supports the main frame F of the machine. The side members 3 of the main frame are connected at their rear ends by a cross-piece 4, and their forward ends are curved downwardly to form brackets 5, provided with eyes 6, in which is journaled a cross-bar 7, which forms a part of the runner-frame S, the latter including in its make-up the runners 8, seed-tubes 9, and seed boxes or hoppers 10, which contain the seed-dropping mechanism, (not shown,) but which is operated by means of a shaft 11, mounted for rotation at the upper ends of the seed-tubes. The shaft 11 is when the machine is in operation rotated continuously for the purpose of causing charges of seeds to be dropped at proper intervals into the seed-tubes 9. The latter are provided with foot-valves 12, operated at suitable intervals by means to be hereinafter described.

The main or wheel frame F is provided at its rear end with an arch 13, supporting the driver's seat 14. Intermediately between the ends of the main frame is mounted a rock-shaft 15, having disposed concentrically therewith a segment-rack 16, adapted to be engaged by a spring-actuated dog or pawl 17, connected with an operating-lever 18, which is firmly connected with the rock-shaft 15. The latter is provided with an arm or crank 19, which is disposed upon the rock-shaft about centrally between the side pieces of the frame.

20 designates the tongue, which is provided at its rear end with a casting 21, provided with loops or eyes 22 for the reception of a transverse bolt 23.

24 designates a yoke the arms or sides of which are provided with slots 25 for the passage of the bolt 23. Between the arms of said yoke is disposed a washer 26, having lugs 27 extended into the slots 25 and guided thereby, said washer supporting a helical spring 28, the upper end of which bears against the upper part of the yoke. The upper end of the yoke is connected with the arm 19 of the rock-shaft 15.

It will be seen that the tongue and the main frame are flexibly supported with relation to each other through the medium of the spring 28, and it will also be seen that by manipulating the lever 18 the rear end of the tongue may be raised or lowered, as may be desired, for the purpose of elevating or lowering the runner-frame in the customary manner.

The main frame is provided with a rearwardly-extending bracket 31, with which is hingedly connected a trailer-frame T, having side pieces 32 and affording bearings for a shaft or axle 33, carrying a trailer-wheel W of considerable diameter. The shaft 33 also carries a bevel-gear 34, meshing with a bevel-pinion 35 upon the rear end of a shaft-section 36, the front end of which is connected with a shaft-section 37, supported in the main frame, by means of a knuckle-joint 38, which is in alinement with the hinge-joint 39, whereby the trailer-frame T is connected with the bracket 31, thereby enabling the shaft-sections 36 and 37, which obviously rotate in unison and which are driven by the trailer-wheel W, to operate at any position which may be assumed by the trailer-frame T.

The seeder-operating shaft 11 carries a bevel-gear 40, and adjacent to said bevel-gear is mounted a loose rotatable sleeve 41, carrying a bracket 42, which is supported upon a suitably-disposed cross-bar 43 and which affords a bearing for the forward end of the shaft-section 37, upon which is mounted a bevel-pinion 44, which is accommodated in a slit or opening in the bracket 42 and which is in mesh with the bevel-gear 40. The seeder-operating shaft 11 will in this manner receive continuous rotary motion from the trailer-wheel. The shaft-section 37 is also provided with a wheel or disk 45, provided with suitably-disposed tappets 46, adapted to engage a crank or arm 47, extending from a rock-shaft 48, provided at the ends thereof with cranks 49, the free ends of which are connected by links 50 with arms 51, that extend rearwardly from the foot-valves 12, which latter are thereby operated at regular intervals. Springs, as 52, are disposed in any suitable manner to cause the rock-shaft 48 to be actuated in a reverse direction and be restored to its normal position immediately upon the tappets 46 passing out of engagement with the arms or cranks 48.

Suitably supported upon the side members of the main frame are a pair of inverted yokes or frames 53, each of which near its lower end accommodates the inner end of one of the markers 54, the outer end of which extends through the frame 53 opposite to the one in which it is pivoted. These markers may simply cross each other between the upright frames 53, or one of said markers may, as shown in the drawings, be bifurcated for a portion of its length to admit of the passage of the other marker between its limbs. When this latter construction is resorted to, care must be taken that the bifurcated portion of the one marker be sufficiently open to admit of the passage of the other marker without danger of its becoming wedged therein, it being necessary at all times that free movement of the markers, independently of each other, shall be possible. The outer ends of the markers are provided with earth-engaging elements 55, which may be of any suitable character. These markers are normally borne with their outer free ends in an elevated position by means including a strap 57, suitably connected with a block 58, which is mounted upon a tongue some distance in front of the frames 53. This strap or bar is supported in rear of the frames 53 by means of a trip-bar 59, having a central elevated portion or cam 60 and provided at the ends thereof with trunnions 61, which are journaled in boxes or bearings 62, supported upon the side members 3 of the main frame. The trip-bar 59 is provided at its widest or cam-shaped portion with a band 63, which extends entirely around the front side and partially over the rear side of said trip member. Pivotally connected with the free upper rear edge of said band is a catch member 64, the free end of which is normally disposed in an upward and forward direction and is connected by means of a wire link 65 with one end of a helical spring 66, the other end of which has connection with an upward extension of the block 58, which supports the strap 57. The latter extends rearwardly under the crossed portions of the markers 54, the free end of said strap being normally supported upon the cam 60 of the trip member 59 when said cam is in a raised position, thus supporting the free ends of the markers in an elevated position, which is their normal position when the machine is traveling over the ground.

The pin or bolt 67, which connects the catch member 64 with the strap 63, is extended to one side and has pivotal connection with the forward end of a connecting-rod 68, the rear end of which has pivotal connection with a lever 69, which extends upwardly and rearwardly from its fulcrum and the handle end of which normally rests against the front edge of the driver's seat.

A standard 70, which is secured to the bracket 31, that extends rearwardly from the main frame, is provided at its lower ends with a pair of disks 71 and with a shovel 72, which coöperate to form a smooth and level furrow as the machine advances during operation, the object of said furrow being to form a track for the trailer-wheel, whereby the latter shall be caused to rotate evenly and accurately, which is obviously important in order to cause the operations of the seed-dropping mechanism to be performed and timed accurately.

From the foregoing description, taken in connection with the drawings hereto annexed, the operation and advantages of this invention will be readily understood. As the machine progresses over the field the trailer-wheel, for which a track is prepared in advance, will serve to actuate the mechanism whereby the seed-dropping mechanism is operated. On arriving at the end of a furrow the driver by manipulating the lever 69 will push the trip member in a forward direction, thus causing the free end of the strap 59 to be lowered, and thus lowering the markers, the ground-engaging members at the outer ends of which will thus indicate the place at which the next row is to be started. The operating-lever 18 is now manipulated to raise the rear end of the tongue for the purpose of elevating the runner-frame from the ground while the machine is being turned. By this operation the free end of the strap 59, which has meanwhile been supported upon a block 74 at the rear end of the tongue, will be elevated with the tongue, thus raising the free ends of the markers. At the same time the tension exerted by the spring 66 upon the catch 64 will serve to elevate the trip member, which is thereby restored to its normal position under the free end of the strap 59, thus supporting the markers until a repetition of the operation is desired.

Having thus described the invention, what is claimed is—

1. In a corn-planter, a wheel-supported main frame, a runner-frame, an operating-shaft, a bracket extending rearwardly from the main frame, a wheel-carrying trailer-frame connected pivotally with said bracket, a bevel-gear carried upon the axle of the trailer-wheel, a shaft-section journaled upon the trailer-frame, a bevel-pinion upon said shaft meshing with the bevel-gear upon the trailer-axle, a shaft-section upon the main frame, a knuckle-joint connecting the shaft-sections, said knuckle-joint being in registry with the hinge of the trailer-frame, and means for transmitting motion from the forward shaft-section to the operating-shaft.

2. In a machine of the class described, a main frame, a runner-frame, an operating-shaft, a frame hingedly connected with the main frame, a trailer-wheel carried by said frame, means for transmitting motion from the trailer-wheel to the operating-shaft, and a standard connected with the main frame and having a pair of disks, and an intermediately-disposed shovel to open a track for the trailer-wheel.

3. In a machine of the class described, a main frame, a runner-frame, a rock-shaft supported upon the main frame and having an arm extending therefrom, a tongue, a yoke connected pivotally and slidingly with said tongue and having slots in the sides thereof, a washer between the arms of said yoke having lugs engaging the slots thereof, a coiled spring disposed between the washer and the top of the yoke and a pivotal connection between the latter and the crank of the rock-shaft.

4. In a machine of the class described, a wheel-supported main frame, a runner-frame, a rock-shaft upon the main frame, a tongue, means connected with the rock-shaft for effecting vertical adjustment of the rear end of the tongue, a pair of markers mounted pivotally at opposite sides of the frame and crossing each other, a strap supported upon the tongue and extending under the crossed portions of the markers, a cam member constituting a trip for supporting the free end of the strap, and means for actuating the trip.

5. In a machine of the class described, a wheel-supported main frame, a runner-frame, a tongue, means for connecting the rear end of the tongue adjustably with the main frame, markers having pivotal supports at opposite sides of the main frame and crossing each other, supporting-blocks upon the tongue in front and in rear of the markers, a strap connected with the forward supporting-block, a cam member adapted to supporting the rear end of said strap, a catch connected pivotally with said cam member, an actuating-spring for the free end of said catch, and means for operating the trip member.

6. In a machine of the class described, a wheel-supported main frame, a runner-frame, a tongue adjustably connected with the main frame, supporting-blocks upon said tongue, upright frames supported upon the sides of the main frame, markers pivoted in the lower part of said frame, crossing each other, and extending each through the opposite frame, a trip member supported pivotally in rear of the marker-frames and having a cam member, a band partly encircling the cam portion of said trip member, a spring-actuated latch connected pivotally with said band, a link likewise connected with said strap, an operating-lever having connection with said link, and a marker-supporting strap connected with the forward support upon the tongue and normally supported upon the cam portion of the trip member.

In testimony that we claim the foregoing as our own we have hereto affixed our signatures in the presence of two witnesses.

HERMANN C. BADENHOP.
WELHELM ROSEBROCK.

Witnesses:
CLIVE C. HANDY,
FRANK B. REYNOLDS.